No. 835,947. PATENTED NOV. 13, 1906.
J. A. HOSP.
WATER HEATING APPARATUS.
APPLICATION FILED MAR. 8, 1906.

WITNESSES:
J. A. Brophy
Theo. J. Hosp

INVENTOR
Jacob A. Hosp
BY Munn & Co.
ATTORNEYS

UNITED STATES PATENT OFFICE.

JACOB ANTHONEY HOSP, OF JACKSONVILLE, ILLINOIS.

WATER-HEATING APPARATUS.

No. 835,947.  Specification of Letters Patent.  Patented Nov. 13, 1906.

Application filed March 8, 1906. Serial No. 304,932.

*To all whom it may concern:*

Be it known that I, JACOB ANTHONEY HOSP, a citizen of the United States, and a resident of Jacksonville, in the county of Morgan and State of Illinois, have invented a new and Improved Water-Heating Apparatus, of which the following is a full, clear, and exact description.

The object of the invention is to provide a new and improved water-heating apparatus more especially designed for heating a small quantity of water at a time, such as is required for bathing or other purposes, the apparatus being very simple and durable in construction and arranged to effectively heat the water in a very short time with an economical expenditure of fuel, such as gas, oil, or the like.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1:
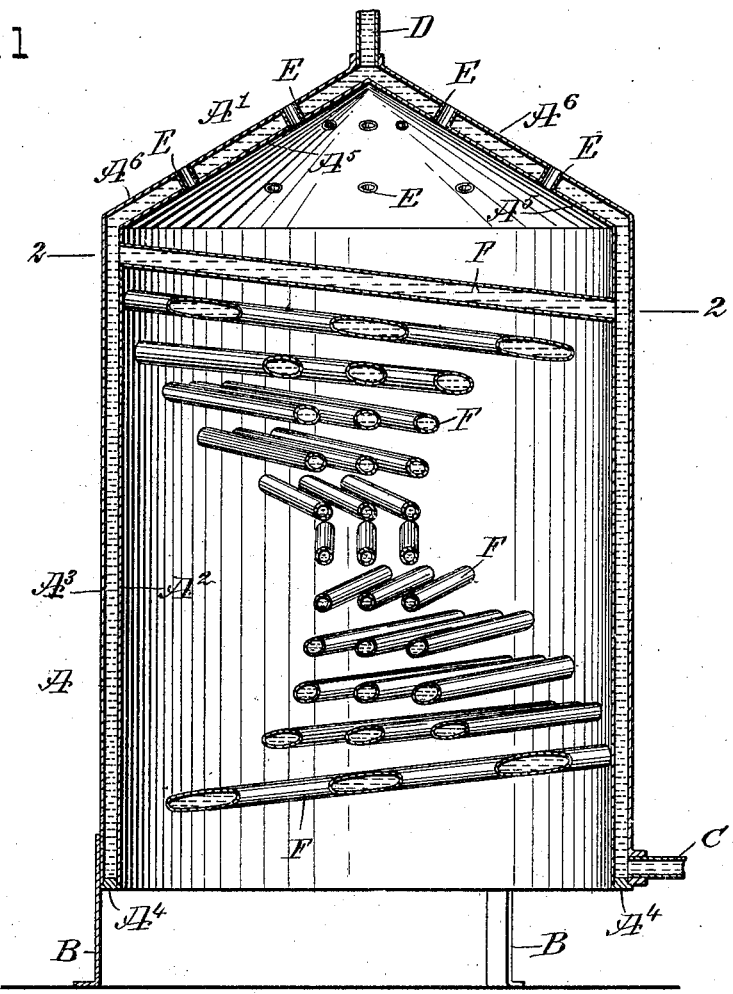
Figure 2:
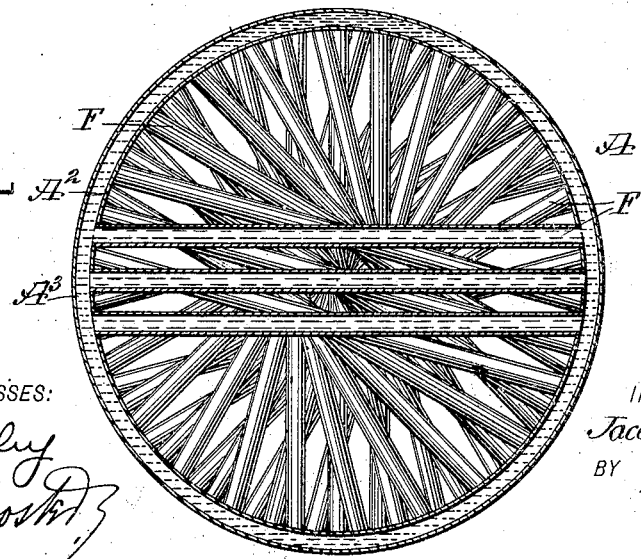

Figure 1 is a sectional side elevation of the improvement, and Fig. 2 is a sectional plan view of the same on the line 2 2 of Fig. 1.

An annular chamber A is provided with a conical top or dome A' and is adapted to contain the water to be heated, and the said chamber A is mounted on suitable legs B, and into its lower end opens a water-supply pipe C. From the apex of the said dome A' leads a discharge-pipe D for carrying off the heated water. The chamber A consists of inner and outer walls $A^2$ $A^3$, preferably of cylindrical shape and spaced a suitable distance apart, the lower ends of the said walls being connected with each other by a ring $A^4$, and the said conical top of the dome A' of the vessel A is likewise formed of spaced inner and outer walls $A^5$ and $A^6$, connected with each other by short pipes E, forming an escape for the heat rising in the dome A'.

Water-circulating pipes F are secured at their ends in the inner wall $A^2$ of the water-chamber A and extend in the space inclosed by the inner wall $A^2$, and the said pipes F are arranged in sets—say three pipes to a set—as shown, the pipes in each set being preferably arranged parallel and spaced apart, as will be readily understood by reference to the drawings. Each set of pipes F is inclined, and the several sets of pipes are arranged in spiral form, so that the heat applied at the open bottom of the space containing the pipes F and rising in the same space comes in contact with all the pipes F to insure an exceedingly rapid heating of the water flowing through the pipes from one side of the water-chamber A to the other.

It is understood that the water enters the pipes F at their lower ends and flows out at their upper ends, and as the pipes are arranged spirally it is evident that the water in the chamber A continues to travel in a spiral path leading from the lower end of the chamber A to the base end of the dome A'. The water traveling through the dome A' flows past the escape-pipes E, thus taking up additional units of heat, it being understood that the water in the chamber A and its dome A' also takes up heat from the inner heated walls $A^2$ and $A^5$. By the arrangement described a large heating-surface in a comparatively small space is obtained, and a rapid circulation of the water and a quick heating thereof is insured.

A gas or other burner is applied to the lower open end of the space containing the pipes F; but as this burner may be of any approved construction it is not deemed necessary to further describe or to show the same.

Having thus described my invention, I claim as new and desire to secure by Letters Patent—

1. A water-heating apparatus, comprising an annular water-chamber provided with a conical top, a water-supply pipe opening into the lower end of the said chamber, a water-outlet pipe leading from the apex of the said conical top, and water-circulating pipes arranged in sets and connected at their ends with the said chamber, the pipes in each set being parallel and spaced apart and inclined, and the sets being arranged in a spiral within the space formed by the inner wall of the chamber.

2. A water-heating apparatus, comprising an annular water-chamber provided with a conical top, a water-supply pipe opening into the lower end of the said chamber, a water-outlet pipe leading from the apex of the said conical top, water-circulating pipes arranged in sets and connected at their ends with the said chamber, the pipes in each set being parallel and spaced apart and inclined, the sets being arranged in a spiral within the space formed by the inner wall of the chamber, and heat-escape pipes arranged in the said conical top and connecting the walls of the conical top with each other.

In testimony whereof I have signed my name to this specification in the presence of two subscribing witnesses.

JACOB ANTHONEY HOSP.

Witnesses:
JNO. E. DAY,
J. S. HAYDEN.